United States Patent [19]

Pan et al.

[11] Patent Number: 5,268,432

[45] Date of Patent: Dec. 7, 1993

[54] HEAT RESISTANT MODIFIED BISMALEIMIDE ADHESIVE COMPOSITION

[75] Inventors: Jing-Pin Pan, Hsinchu; Tsung-Hsiung Wang; Shing-Yaw Hsu, both of Taichung Hsien; Tzong-Ming Lee, Tainan; Syh-Ming Ho, Hsinchu, all of Taiwan

[73] Assignee: Industrial Technology Research Institute, China

[21] Appl. No.: 898,008

[22] Filed: Jun. 16, 1992

[51] Int. Cl.$^5$ .................. C08G 69/48; C08G 69/26; C08G 59/14
[52] U.S. Cl. .................. 525/422; 525/423; 525/530; 524/879; 528/102; 528/114; 528/117; 528/322
[58] Field of Search ............... 524/607, 879; 528/322, 528/102, 114; 525/422, 423, 530

[56] References Cited

U.S. PATENT DOCUMENTS

| | | | |
|---|---|---|---|
| 3,886,119 | 5/1975 | D'Alelio | 524/879 |
| 4,107,153 | 8/1978 | Akiyama et al. | 524/607 |
| 5,041,519 | 8/1991 | Pan et al. | 528/322 |

FOREIGN PATENT DOCUMENTS 61-98782 5/1986 Japan .

Primary Examiner—Paul R. Michl
Assistant Examiner—Tae H. Yoon
Attorney, Agent, or Firm—Scully, Scott, Murphy & Presser

[57] ABSTRACT

A heat resistant adhesive composition comprising an admixture of a modified bismaleimide (BMI) resin, a modified polyamide-imide and a solvent. The bismaleimide is modified by barbituric acid and/or the derivatives thereof and the polyamide-imide is modified by an epoxy resin. The overall solid content of the heat resistant adhesive composition is in the range of about 15 to 50 percent by weight, wherein solid contents per overall solid content of the modified bismaleimide resin and the modified polyamide-imide are 60 to 90 percent and 10 to 40 percent, respectively.

10 Claims, 1 Drawing Sheet

HEAT RESISTANT MODIFIED BISMALEIMIDE ADHESIVE COMPOSITION

BACKGROUND OF THE INVENTION

The present invention relates to a heat resistant adhesive composition, in particular, to a modified bismaleimide in admixture with modified polyamideimide for heat resistant adhesives with high performance.

In general, the adhesives used in three-layer flexible printed circuit (3-layer FPC) or three-layer tape automatic bonding (3-layer TAB) are of acrylic or epoxy series. The glass transition temperature (Tg) and heat resistance of the acrylic or epoxy series are lower than those of substrates, i.e., polyimide (PI). Thus, with increasing requirements of high packaging density for electronic devices, the adhesives having low Tg and poor temperature resistance are limited in the manufacturing process and cannot be widely applied in adhesion of electronic devices required for high density.

Owing to the fact that bismaleimide (BMI) possesses heat resistance which is about the same as that of polyimide and is reactive, BMI can be used to improve the high temperature resistance of adhesives for 3-layer FPC or 3-layer TAB. However, due to the crosslinking reaction of BMI, the product obtained after the crosslinking reaction is relatively hard and fragile. That is, BMI is not suited for direct use in the adhesives. In order to get better softness and to be consistent with the requirements for 3-layer FPC or 3-layer TAB, BMI should be improved or modified. After being modified, BMI is admixed with modified polyamide-imide (PAI), the composition will form adhesives with heat resistance, such as disclosed in Japan Patent No. Sho-61-98782. However, the above composition used as adhesives in 3-layer FPC or 3-layer TAB still results in drawbacks in processing. For example, after coating the PI substrate with BMI, the BMI coating hardens and shrinks, generally resulting in poor surface smoothness on the final products.

Japan Patent No. Sho-61-98782 discloses an invention of utilizing PAI to react with an epoxy resin in reducing the number of unreacted PAI functional groups and then adding a suitable amount of diamine modified BMI to improve the heat resistance and the adhesion with metals.

The present invention and Japan Patent No. Sho-61-98782 all teach the BMI/PAI series for a heat resistant adhesive composition. However, in the Japan patent, the BMI of the BMI/PAI series is modified by diamine. When the modified BMI coats and hardens onto the PI substrate, owing to the reactivity of diamine itself, the crosslinking reaction of the double bond often occurs. The coating film will shrink considerably and result in a poor degree of surface smoothness in the final products. On the other hand, the BMI used in the present invention is modified by special synthesis technology and is then mixed with PAI, which is modified by epoxy in producing a heat resistant adhesive composition. The Tg value of the adhesive composition will not decrease. The shrinkage is small and the dimension of the coating film is constant. Most importantly, the properties of heat resistance and adhesion are good.

To eliminate the drawbacks of poor surface smoothness as with the Japanese art cited herein, a special synthesis technology is utilized in this invention to adequately modify the quality of BMI by free radical reaction. First, the double bond of BMI is reacted, that is, the monomer of BMI is modified and reacts to become oligomers which have higher molecular weights and can be dissolved in solvent. Subsequently, the above oligomers are mixed with PAI, which has been modified by epoxy, to form the desired composition. However, the modification of BMI itself relies on the reaction of the double bond thereof by free radical reaction. For example, after the BMI coats and hardens on the substrate, the shrinkage for the improved BMI decreases while still retaining excellent adhesive properties with the substrate. Owing to the hardening reaction for the double bond of BMI itself, the heat resistance of the above modified BMI is better than that of BMI modified by diamine. Furthermore, the Tg of the modified BMI based on the reaction of double bonds can be kept at a high value. However, if BMI is modified by diamine, the value of Tg will decrease considerably and the dimensional stability will decrease.

Although there are other patents relate to adhesive compositions of BMI/PAI systems, the BMI of these patents is not modified by barbituric acid (BTA) and the ratios of the compositions are also different from that of the present invention. Hence, the present invention provides an adhesive composition with excellent surface smoothness and high heat resistance properties for 3-layer FPC or 3-layer TAB.

SUMMARY OF THE INVENTION

Therefore, the present invention provides a heat resistant adhesive composition having excellent high temperature resistance and high glass transition temperature.

It is another objective of the present invention to provide a heat resistant adhesive composition which shrinks less when coated on the substrate and maintains a high degree of surface smoothness and adhesiveness.

These and other objectives, advantages and features of the present invention will be more fully understood and appreciated by reference to the written specification.

DETAILED DESCRIPTION OF THE INVENTION

Figure 1:
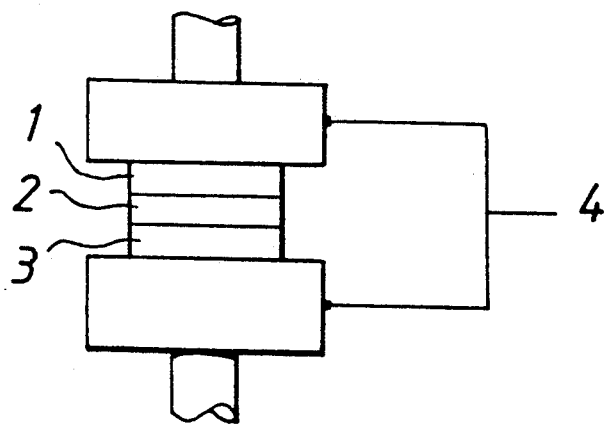
FIG. 1 is a diagram showing the setup for fabricating a PI/Adhesive/Cu laminate.

While this specification concludes with claims particularly pointing out and distinctly claiming that which is considered to be the invention, it is believed that the invention can be better understood from a reading of the following detailed description of the invention and the appended examples.

In accordance with the present invention, a heat resistant composition is used as an adhesive in 3-layer FPC or 3-layer TAB. The heat resistant adhesive composition comprises an admixture of a modified bismaleimide (BMI) resin, a modified polyamide-imide and a solvent. The overall solid content of the heat resistant adhesive composition is in the range of about 15 to 50 percent by weight, wherein the solid contents per overall solid content of the modified bismaleimide resin and the modified polyamide-imide are 60 to 90 percent and 10 to 40 percent, respectively. The BMI is modified by reacting with a barbituric acid (BTA) or the derivatives thereof, in an adequate amount of solvent, in a molar ratio within the range of about 3:1 to 10:1 at a temperature of 100° to 130° C. for 0.5 to 6 hours, to obtain a solid content of about 40 to 60% by weight. In addition, the polyamide-imide is modified by reacting with an epoxy resin, in an adequate amount of solvent, in a molar ratio of amido to epoxide group within the range of about 1:1 to 3:1 at a temperature range of 140° to 160° C. for 0.5 to 3 hours, to obtain a solid content of about 30 to 40% by weight. The solvent used in the invention is selected from a group consisting of dimethylacetamide, dimethyl formamide and N-methyl-pyrrolidone.

The characteristics of the present invention are heat resistance, high adhesiveness, and application on 3-layer FPC or 3-layer TAB. The raw materials used in the invention comprise polyamide-imide (PAI), epoxy, bismaleimide (BMI) and barbituric acid (BTA) and the derivatives thereof.

The adhesive composition of the present invention is prepared as follows. After BMI and BTA or its derivatives react and epoxy and PAI react, solvents are added to the products of the above two reactions for further mixing. Then the heat resistant adhesive composition of the present invention is obtained. The production procedures of some materials, especially modified materials disclosed in the present invention, will be further described in the following examples.

The raw materials used in the present invention will be further described as follows:

(A) Bismaleimide (BMI) resin:
The BMI resin has the general formula of:

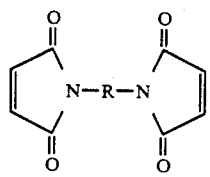

wherein R is selected from —(CH$_2$)$_2$—, —(CH$_2$)$_6$—, —(CH$_2$)$_8$—,

—(CH$_2$)$_{12}$—, —CH$_2$—C(CH$_3$)$_2$—CH$_2$—CH(CH$_3$)—CH$_2$—CH$_2$—,

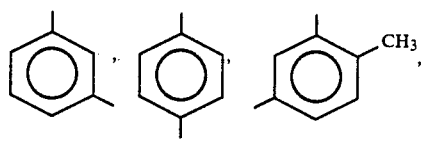

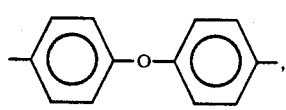

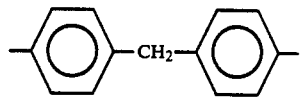

(B) Barbituric acid (BTA) or the derivatives thereof:
The structure of BTA or derivatives thereof is

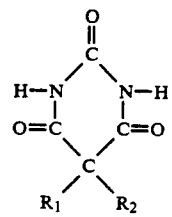

wherein R$_1$ and R$_2$ are selected from —H, —CH$_3$, —C$_6$H$_5$, —CH(CH$_3$)$_2$, —CH$_2$CH(CH$_3$)$_2$, —CH$_2$CH$_2$CH(CH$_3$)$_2$,

—CH(CH$_3$)—(CH$_2$)$_2$CH$_3$.

(C) Polyamide-imide (PAI):
The structure of polyamide-imide (PAI) is

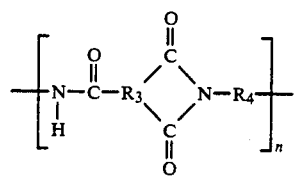

wherein R$_3$ and R$_4$ are selected from

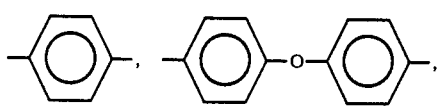

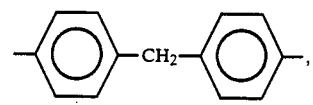

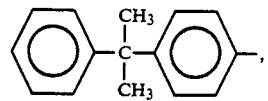

(D) Epoxy resin:
The structure of epoxy resin is

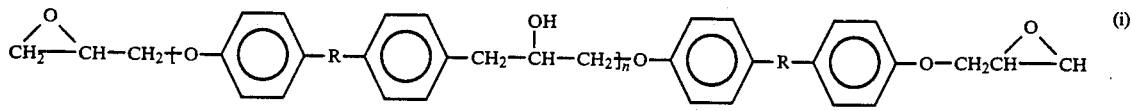

wherein R represents alkyl with 1–4 carbons, n is a positive integer and the epoxide equivalent of the epoxy resin is 150–1000; or

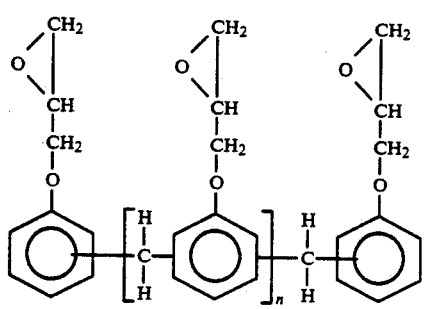

(ii)

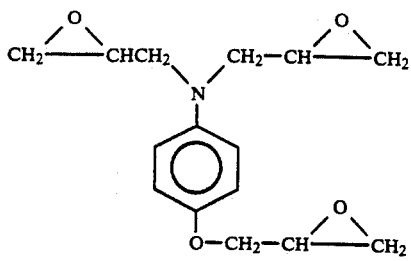

(4) diglycidyl ether of bisphenol A

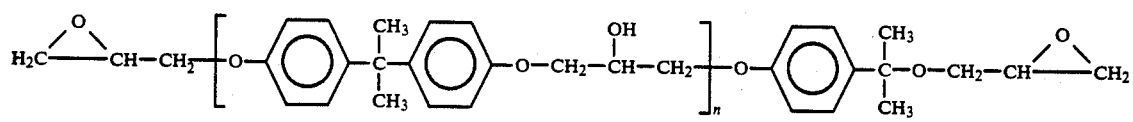

(5) glycidyl ether of novolac wherein n is a positive integer and the epoxide equivalent of the epoxy resin is 150–300.

In particular, the epoxy resin is selected from the group consisting of (1) tetraglycidylmethylene dianiline,

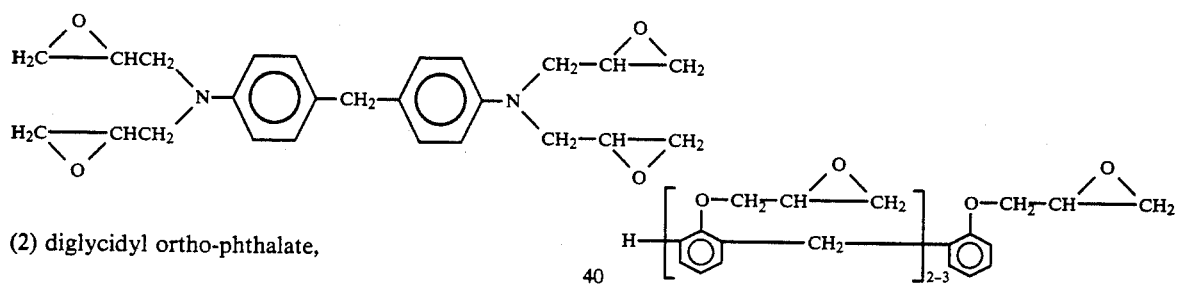

(2) diglycidyl ortho-phthalate, (6) glycidyl ether of bisphenol A (BPA) novolac

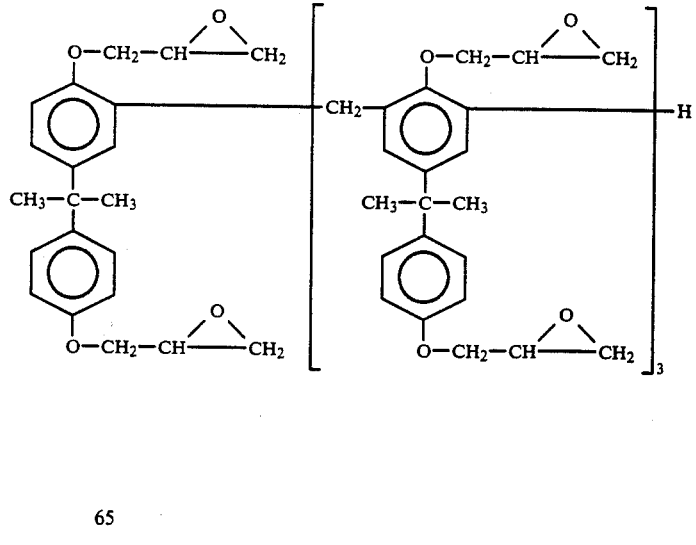

(3) N, N'-diglycidyl-p-aminophenylglycidyl ether, (7) epoxy cresol novolac

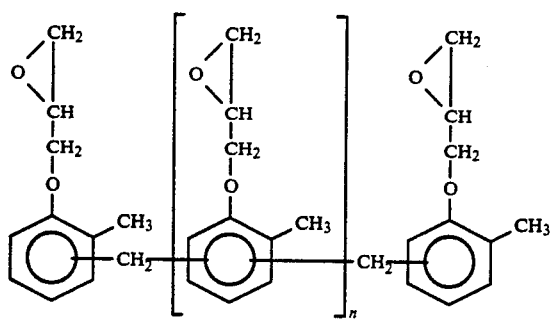

and the derivatives of the above compounds, for example, the derivatives containing bromine or the mixtures thereof.

Although Japan Patent No. Sho-61-98782 disclosed a BMI/PAI heat resistant adhesive composition, the key point of the invention is the reaction of polyamideimide and epoxy resin and then, the addition of BMI, which has been modified by diamine, to increase the adhesion with metals and heat resistance. However, the BMI used in the Japan patent is commercially available BMI modified by diamine. The amount of diamine used in BMI has a limit. For instance, the amount of diamine used in Kerimid 601 is only about 7% by weight. If too much diamine is used, the heat resistance of BMI modified by diamine will be significantly lower than that of BMI with reaction of the double bonds themselves as with the current invention. The glass transition temperature is also significantly lowered. The drawbacks will greatly limit the use of the adhesive composition of the Japan patent. However, if unmodified BMI is directly coated on the substrate, it will result in a low degree of surface smoothness of the adhesive composition due to its considerable shrinkage.

The particular characteristic of the present invention is the special synthesis technology for the reaction of double bonds of BMI with barbituric acid and then mixing with PAI, which has been modified by epoxy resin, to form a heat adhesive composition. Owing to the relative high Tg value of BMI and PAI, the Tg value of the composition in the present invention is also relatively high. Furthermore, due to the modification of BMI and PAI in advance, the influence on the shrinkage for the adhesive composition in the invention is quite low and the dimentional stability for the composition is relatively high. Also, the adhesion between BMI and/or PAI and polyimide is excellent. Thus, due to the existence of epoxy, the adhesiveness of the composition towards copper foil is much better than with prior art. That is, the modified BMI/PAI for a heat resistant adhesive composition in the invention can be widely applied on the mounting technology for 3-layer FPC or 3-layer TAB based on the substrate of copper foil and polyimide. Furthermore, the heat resistant adhesives in the present invention are preferably applied between metals, such as copper, aluminum, chromium, nickel, titanium, gold, silver, etc., and polymers, such as polyimide, polyesterimide, polyethylenimide, polyesteramide, polyethylenamide, polyamide-imide, etc.

Compared with the prior art, the improvements of the present invention are clearly shown and listed in the following:

1. In the BMI/PAI series, if BMI is not modified, the crosslinking phenomena will easily occur in the double bond on the end of BMI and affect the dimentional stability of the adhesive composition coating on the substrate. Owing to the poor dimensional stability, the adhesive composition used on the 3-layer FPC or 3-layer TAB will usually result in deformation on the mounting elements or inaccurate positioning of the mounting elements which require extremely high packaging density and high function.

2. In the BMI/PAI series, if BMI is modified by diamine, the crosslinking density of the BMI composition is quite low. However, the Tg value for the composition will decrease when diamine is added, that is, the heat resistance of the adhesive composition will also decrease.

3. In the BMI/PAI series of the present invention, BMI is modified using barbituric acid. The double bond on the end of BMI will react with barbituric acid. After the crosslinking reaction of the modified BMI, the dimention of the adhesive will often remain unchanged. Also, the Tg value will not be decreased. The high temperature resistance property and the dimention of the adhesive composition in the present invention are all kept stable.

The following examples are offered by way of illustration. The examples are not intended to limit the scope of the invention in any respect and should not be so construed.

EXAMPLES

Example 1

(A) The preparation of polyamide-imide:

25 grams methylene diisocyanate was added into a 500 ml three-necked bottle containing 19.2 grams trimellitic anhydride. Then, 100 ml dimethylacetamide was added as solvent into the bottle. The mixture was reacted at a temperature of 160° C. for about 2 hours. When no gases were produced, the mixture was cooled to room temperature. Finally, the solid content, i.e., polyamide-imide varnish, of the resulting product was about 31% by weight.

(B) The preparation of modified BMI:

120 grams N, N'-4,4'-diphenylmethyl bismaleimide was dissolved in 160 grams butyrolactone. Then, 10.5 grams barbituric acid was added into the mixture. The mixture was stirred and heated at a temperature of 120° C. for 3 hours to obtain the modified BMI containing solid content of about 45% by weight.

(C) The preparation of polyamide-imide which is modified using epoxy:

4.8 grams epoxy with equivalent of 190 and 73.2 grams polyamide-imide were dissolved into 100 ml N-methyl-pyrrolidone (NMP). The above mixture was reacted at a temperature of 150° C. for 1 hour and then cooled to room temperature. The final mixture contained solid content of about 35.5% by weight.

(D) The preparation of BMI/PAI composition:

The modified BMI of the above step (B) and polyamide-imide, which was modified using epoxy, of step (C) were mixed together and reacted at a temperature of 50° C. for 1 hour. Then, an adequate amount of solvent, i.e., N-methyl-pyrrolidone, was added to obtain the final mixture containing solid content of 30%.

Figure 2:
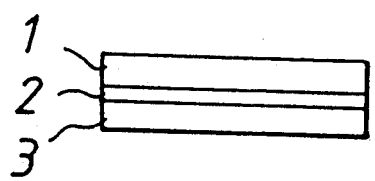
FIG. 2 is a diagram showing the PI/Adhesive/Cu laminate obtained.

(E) The production of PI/Adhesive/Cu laminate:

The copper foil (3) was coated with the varnish (2), i.e., heat resistant adhesive, obtained from step (D) and then the varnish (2) was coated with a polyimide film (1). The copper foil (3) with two films (1) and (2) was then placed between two thermal compressors (4). The whole assembly was then dried in an oven at a temperature of 160° C. for 10 min. After removal from the oven, the PI/Adhesive/Cu laminate was produced according to laminate pressurized procedures. Referring to FIG. 1, there is shown an assembly for a PI/Adhesive/Cu laminate using the heat resistant adhesive composition of the present invention. The assembly was then treated in an oven under the following sequences: heating at a temperature of 140° C. for 20 min., at a temperature of 140° C. and at a pressure of 50 psi for 20 min., at a temperature of 180° C. and at a pressure of 50 psi for 20 min., at a temperature of 180° C. and at a pressure of 200 psi for 1 hour, at a temperature of 220° C. and at a pressure of 200 psi for 20 min., at a temperature of 250° C. and at a pressure of 200 psi for 1 hour. Finally, the treated copper foil (3) with heat resistant adhesive (2) and polyimide film (1) as shown in FIG. 2 were cooled to room temperature. The obtained PI/Adhesive/Cu laminate was then tested.

(F) Determination of peel strength:

The copper surface of the PI/Adhesive/Cu laminate of step (E) was washed with degreaser, 5% NaOH aqueous solution and 5% $H_2SO_4$ aqueous solution for one minute, respectively, and-then was washed with water for 2 minutes. After washing, the laminate was dried by an air-gun and then dried in an oven at a temperature of 80° C. The clean copper surface was thermally pressured with a dry film and then treated by the processes of exposure, development, etching and peeling the dry film to obtain a copper wire with a width of ⅛ inch. The copper wire was tested by a traction machine (AG 5000A - Shimadzu) to undergo peel tests at an angle of 90° at a peeling rate of 25 mm/min. The result is listed in Table 1.

(G) Determination of glass transition temperature (Tg):

The BMI/PAI varnish obtained in step (D) was coated at a specific thickness on a particular glass cotton yarn. The glass cotton yarn was dried at a temperature of 110° C. and then tested by plastics analysis instruments model TBA/HP-01 for the glass transition temperature.

(H) Determination of soldering tests at a temperature of 280° C.:

The PI/Adhesive/Cu laminate of step (E) was impregnated in a soldering oven at a temperature of 280° C. for 30 sec. The change of the laminate was observed and recorded in Table 1.

(I) Determination of shrinkage:

The adhesive film was cut into small pieces with a size of 10 cm × 10 cm. The four corners of a small piece were marked at four fixed points and the position coordinates thereof were recorded. After the small adhesive film was dried in an oven at a temperature of 250° C. for 4 hours and then cooled to the room temperature, the position coordinates of the four corners were measured again and the shrinkage was calculated and recorded in Table 1.

COMPARATIVE EXAMPLE 1

4.8 grams epoxy resin (from Mitsui Petroleum Chemicals, the epoxide equivalent is 190) and 22.7 grams polyamide-imide resin (from Mitsubishi Chemicals) were placed into a one liter three-necked bottle. Then, 335 grams N-methyl-pyrrolidone (NMP) solvent was added into the bottle for dissolution. The mixture reacted at a temperature of 150° C. for 1 hour and then was cooled to room temperature.

120 grams BMI (from Rhone Poulene in France, Kerimide 601) was added to the mixture of the above step. The mixture was reacted at a temperature of 50° C. for one hour. After vigorous dissolving, an adequate amount of NMP was added to the mixture to obtain the final mixture containing a solid content of about 30%.

The steps of (F), (G), (H) and (I) in example 1 for the determination of the properties of the composition were repeated and the results were recorded in Table 1.

COMPARATIVE EXAMPLE 2

6.5 grams epoxy resin (from Mitsui Petroleum Chemicals, the epoxide equivalent is 185) and 21.0 grams polyamide-imide resin (from Mitsubishi Chemicals) were placed into a one liter three-necked bottle. 228 ml dimethyl formamide (DMF) was added into the bottle to dissolve the above two chemicals. The mixture was then reacted at a temperature of 160° C. for 1 hour and was then cooled to room temperature.

Another 125 grams unmodified BMI was added into the mixture obtained in the above step. The mixture was reacted at a temperature of 50° C. for 1 hour, and then an adequate amount of dimethyl formamide (DMF) was added to obtain the final mixture containing a solid content of about 30%.

The steps of (F), (G), (H) and (I) in example 1 for the determination of the properties of the composition were repeated and the results were recorded in Table 1.

TABLE 1

| | testing Items | | | |
|---|---|---|---|---|
| Example | Peel Strenght of Polyimide/ Cu (lb/in) | Tg (°C.) | Shrinkage (250° C., 4h) (%) | Soldering Test (280° C., 30sec) |
| 1 | 8.2 | >280 | 0.1 | No Deformation of Shape |
| Comp. 1 | 6.7 | 250 | 0.5 | Seriously Twisted Deformation |
| Comp. 2 | 6.5 | 270 | 0.7 | Twisted Deformation |

The peel strength of the adhesives in the present invention used between PI and copper foil is 8.2 lbs/in which is better than that of adhesives prepared by comparative example 1 with BMI, modified by diamine, and comparative example 2 with unmodified BMI. Also, the Tg value of adhesives in the present invention is greater than 280° C. and offers excellent heat resistance. Furthermore, when the soldering test of the laminate in example 1 was finished, no deformation of shape was observed. However, the laminates of comparative examples 1 and 2 using different adhesives result in twisted deformation. The structure of the adhesives in the invention is more compact. As a result, the shrinkage in example 1 is only 0.1% which is lower than the others.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

What is claimed is:

1. A heat resistant adhesive composition comprising an admixture of a bismaleimide resin modified by reacting said bismaleimide resin with barbituric acid or a derivative thereof having the structural formula

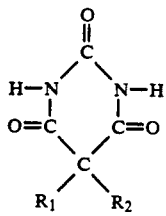

where $R_1$ and $R_2$ are hydrogen, methyl, phenyl, isopropyl, $-CH_2CH(CH_3)_2$, $-CH_2CH_2CH(CH_3)_2$ or

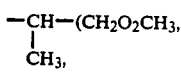

a polyamide imide modified by reaction with an epoxy resin and a solvent, wherein the overall solid content of said composition is in the range of about 15 to 50 percent by weight.

2. A heat resistant adhesive composition as set forth in claim 1, wherein a solid content of the modified bismaleimide resin per said overall solid content is 60 to 90 percent.

3. A heat resistant adhesive composition as set forth in claim 1, wherein a solid content of the modified polyamide-imide per said overall solid content is 10 to 40 percent.

4. A heat resistant adhesive composition as set forth in claim 1, wherein said modified bismaleimide resin is formed by reacting said bismaleimide resin with said barbituric acid or said derivative thereof in a molar ratio in the range of 3:1 to 10:1 at a temperature of 100° C. to 130° C. for 0.5 to 6 hours to obtain a solid content of about 40 to 60 percent.

5. A heat resistant adhesive composition as set forth in claim 1, wherein the polyamideimide reaction with said epoxy resin requires the amido group of the polyamide-imide and the epoxide group of the epoxy resin to be present such that the molar ratio of the amido group to the epoxide group is in the range of 1:1 to 3:1, said reaction occurring at a temperature of 140° to 160° C. for 0.5 to 6 hours to obtain a modified polyamide-imide having a solid content of about 30 to 40 percent.

6. A heat resistant adhesive composition as set forth in claim 1, wherein the bismaleimide has the formula

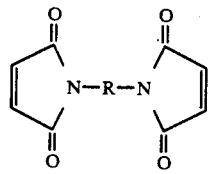

wherein R is selected from $-(CH_2)_2-$, $-(CH_2)_6-$, $-(CH_2)_8$,

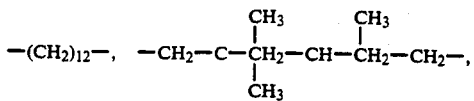

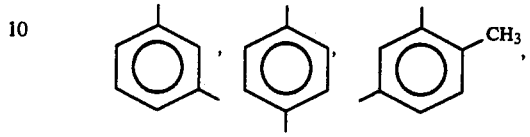

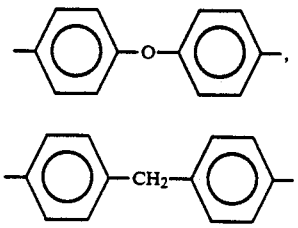

7. A heat resistant adhesive composition as set forth in claim 5, wherein the epoxy resin has the formula

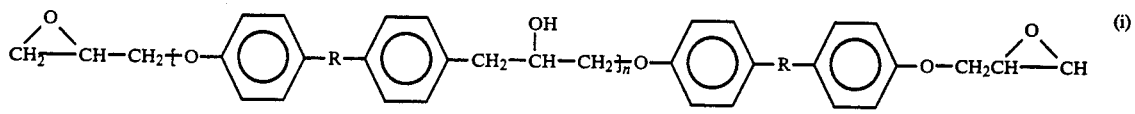 (i)

wherein R represents alkyl with 1–4 carbons, n is a positive integer and the epoxide equivalent of the epoxy resin is 150–1000; or

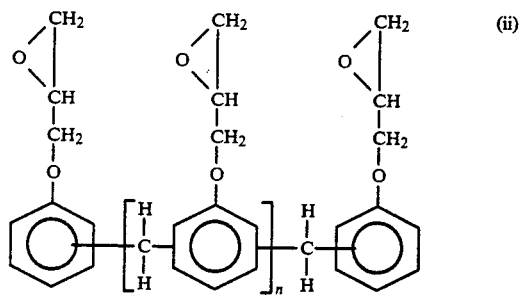 (ii)

wherein n is a positive integer and the epoxide equivalent of the epoxy resin is 150–300.

8. A heat resistant adhesive composition as set forth in claim 1, wherein the polyamide-imide has the general formula

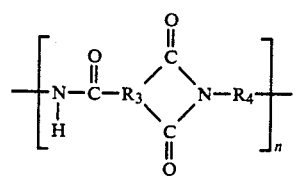

wherein $R_3$ and $R_4$ are

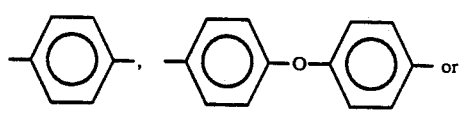

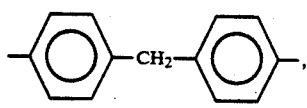

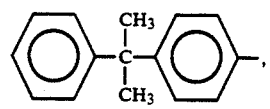

9. A heat resistant adhesive composition as set forth in claim 7, wherein the epoxy resin is the diglycidyl ether of bisphenol A.

10. A heat resistant adhesive composition as set forth in claim 7, wherein the epoxy resin is selected from the group consisting of a bromine-containing derivative of the diglycidyl ether of bisphenol A and a mixture of the diglycidyl ether of bisphenol A and a bromine-containing derivative of the diglycidyl ether of bisphenol A.

* * * * *